Patented July 19, 1932

1,868,095

UNITED STATES PATENT OFFICE

MAX DOHRN, OF BERLIN-CHARLOTTENBURG, AND WALTER HOHLWEG, OF BERLIN-HOHENNEUENDORF, GERMANY, ASSIGNORS TO SCHERING-KAHLBAUM A.-G., OF BERLIN, GERMANY

PROCESS FOR THE RECOVERY OF A HIGHLY PURIFIED HORMONE OF THE ANTERIOR LOBE OF THE PITUITARY GLAND

No Drawing. Application filed June 10, 1929, Serial No. 369,921, and in Germany June 19, 1928.

Our invention refers to the recovery of a highly purified hormone of the anterior lobe of the pituitary gland.

As it is well known the hormones are not only found in the glands, where they are produced, but also in other parts of the organism and also in its secretions.

The hormone of the anterior lobe for example is present not only in the anterior lobe but also in the blood, especially of pregnant mammals, in the placenta and in the urine and the excrements. This hormone can be identified by its exciting effect on the male and female germ glands, it is therefore in contradistinction to the hormone of the germ glands without effect on the gelded organism. These hormones are also distinct in their chemical behaviour, the hormone of the germ glands being easily soluble in organic solvents, the hormone of the anterior lobe being precipitated from aqueous solutions by means of organic solvents.

By precipitation with organic solvents not only the hormone of the anterior lobe but also salts and other substances simultaneously are precipitated. For the recovery of a highly purified hormone it is therefore necessary to treat the aqueous solutions of the hormones with such precipitants, which separate out the bulk of the impurities without carrying down the hormone. Such precipitants are compounds of the alkaline earths and of the heavy metals.

Example 1

5 litres urine of pregnant individuals are concentrated to 1 litre, slightly acidified with acetic acid and filtered. To the filtrate a concentrated solution of barium chloride is added until a filtered sample of the solution is no more troubled by further addition of barium chloride. The deposit is filtered off and in the filtrate the excess of the barium chloride is precipitated by sodium sulphate. The solution after being freed from the barium-sulphate by decantation and filtration is added to three times its volume of methanol. A whitish deposit separates out, which after standing for some hours is separated by filtering. The hormone is entirely contained in this deposit. By dissolving in water and precipitating with alcohol once more a further purification can be obtained.

Example 2

To 4 litres concentrated urine of pregnant individuals lead acetate is added until no further deposit separates out. After filtration the excess of the lead acetate is eliminated by sulphurated hydrogen and the filtrate worked up according to Example 1.

Example 3

10 kg. comminuted placentae are stirred with 10 kg. water and 3 kg. calcium hydroxide. After centrifuging the alkaline liquid is treated with carbon-dioxide until the calciumhydroxide is entirely precipitated and the liquid after filtering concentrated in vacuo. From the concentrated liquid the hormone is precipitated with alcohol.

Example 4

500 g. of the anterior lobe of the pituitary gland finely comminuted in the colloid-mill are stirred with 1.5 kg. water and slightly acidulated with diluted acetic acid. The mass is filtered and to the filtrate a solution of barium chloride is added. The further working up is effected according to Example 1.

Various changes may be made in the details disclosed in the foregoing specification without departing from the invention or sacrificing the advantages thereof.

In the following claims the term aqueous solutions of the hormone is intended to cover also aqueous extracts of the hormone as well as secretions of the organism and watery pastes of the organ which contain the hormone.

We claim:

1. Process for the recovery of a highly purified hormone of the anterior lobe of the pituitary gland comprising treating aqueous solutions of the hormone with a water soluble compound of the metals belonging to the group of heavy metals and alkaline earth metals, separating the liquid from the deposit and precipitating the hormone in the liquid by means of an organic solvent miscible with water.

2. Process for the recovery of a highly purified hormone of the anterior lobe of the pituitary gland comprising treating aqueous solutions of the hormone with a water soluble compound of an alkaline earth separating the liquid from the deposit and precipitating the hormone in the liquid by means of an organic solvent miscible with water.

3. Process for the recovery of a highly purified hormone of the anterior lobe of the pituitary gland comprising treating aqueous solutions of the hormone with a water soluble salt of barium separating the liquid from the deposit and precipitating the hormone in the liquid by means of an organic solvent miscible with water.

4. Process for the recovery of a highly purified hormone of the anterior lobe of the pituitary gland comprising treating aqueous solutions of the hormone with barium chloride separating the liquid from the deposit and precipitating the hormone in the liquid by means of an organic solvent miscible with water.

5. Process for the recovery of a highly purified hormone of the anterior lobe of the pituitary gland comprising treating aqueous solutions of the hormone with barium chloride removing the excess of the barium chloride with an alkalisulphate and after eliminating the deposit precipitating the hormone in the liquid by means of an organic solvent miscible with water.

6. Process for the recovery of a highly purified hormone of the anterior lobe of the pituitary gland comprising treating aqueous solutions of the hormone with a water soluble compound of a heavy metal, separating the liquid from the deposit and precipitating the hormone in the liquid by means of an organic solvent miscible with water.

MAX DOHRN.
WALTER HOHLWEG.